Aug. 18, 1964 W. F. LYONS, JR 3,145,378

RETRACE INSERTION SYSTEM

Filed March 30, 1960 4 Sheets-Sheet 1

INVENTOR
WILLIAM F. LYONS, JR.

AGENT

Aug. 18, 1964 W. F. LYONS, JR 3,145,378

RETRACE INSERTION SYSTEM

Filed March 30, 1960 4 Sheets-Sheet 2

INVENTOR.
WILLIAM F. LYONS, JR.

BY [signature]
AGENT

Aug. 18, 1964 W. F. LYONS, JR 3,145,378

RETRACE INSERTION SYSTEM

Filed March 30, 1960 4 Sheets-Sheet 3

INVENTOR.
WILLIAM F. LYONS, JR.

BY [signature]

AGENT

INVENTOR.
WILLIAM F. LYONS, JR.
BY Arthur L. Branning
AGENT 3,145,378

RETRACE INSERTION SYSTEM

William F. Lyons, Jr., Chalfont, Pa., assignor to the United States of America as represented by the Secretary of the Navy Filed Mar. 30, 1960, Ser. No. 18,774
21 Claims. (Cl. 343—5)
(Granted under Title 35, U.S. Code (1952), sec. 266)

The invention described herein may be manufactured and used by or for the Government of the United States of America for governmental purposes without the payment of any royalties thereon or therefor.

The present invention relates to a retrace insertion system and more particularly to a retrace insertion system for use with a cathode ray tube indicator, for example of the plan position type, whereby a variety of markers or symbols may be displayed on the indicator conjointly with target, beacon, or other displays for identification or plotting purposes.

In modern tactical data display systems presenting information derived from radar apparatus and other sources, the quantity and variety of data displayed makes difficult interpretive and plotting functions performed by human operators. This difficulty can be greatly minimized by projecting upon the cathode ray tube screen of the display indicator variously configured identifying symbols superimposed upon or located adjacent target and other data normally displayed thereon. The present invention provides novel apparatus and systems which utilize the sweep retrace interval to generate and display the desired symbols to thereby avoid interference with the normal functions of the display system.

It is an object of the present invention to provide apparatus and systems operative to generate and display identifying symbols upon the screen of a cathode ray tube indicator without interfering with the normal functions thereof.

It is another object of the present invention to provide apparatus and systems of the character described in the next preceding object which function during the sweep retrace interval and which may be operative to isolate normal modulating and control signals from the cathode ray tube during this interval.

Other objects and many of the attendant advantages of this invention will be readily appreciated as the same becomes better understood by reference to the following detailed description when considered in connection with the accompanying drawings wherein.

For illustrative purposes, an embodiment of the invention will be described below for use with an indicating system of the time sharing type wherein a sweep interval is periodically utilized to generate and display a slewable cursor or cursors which may be employed to perform interpretive or plotting functions.

Figure 1:
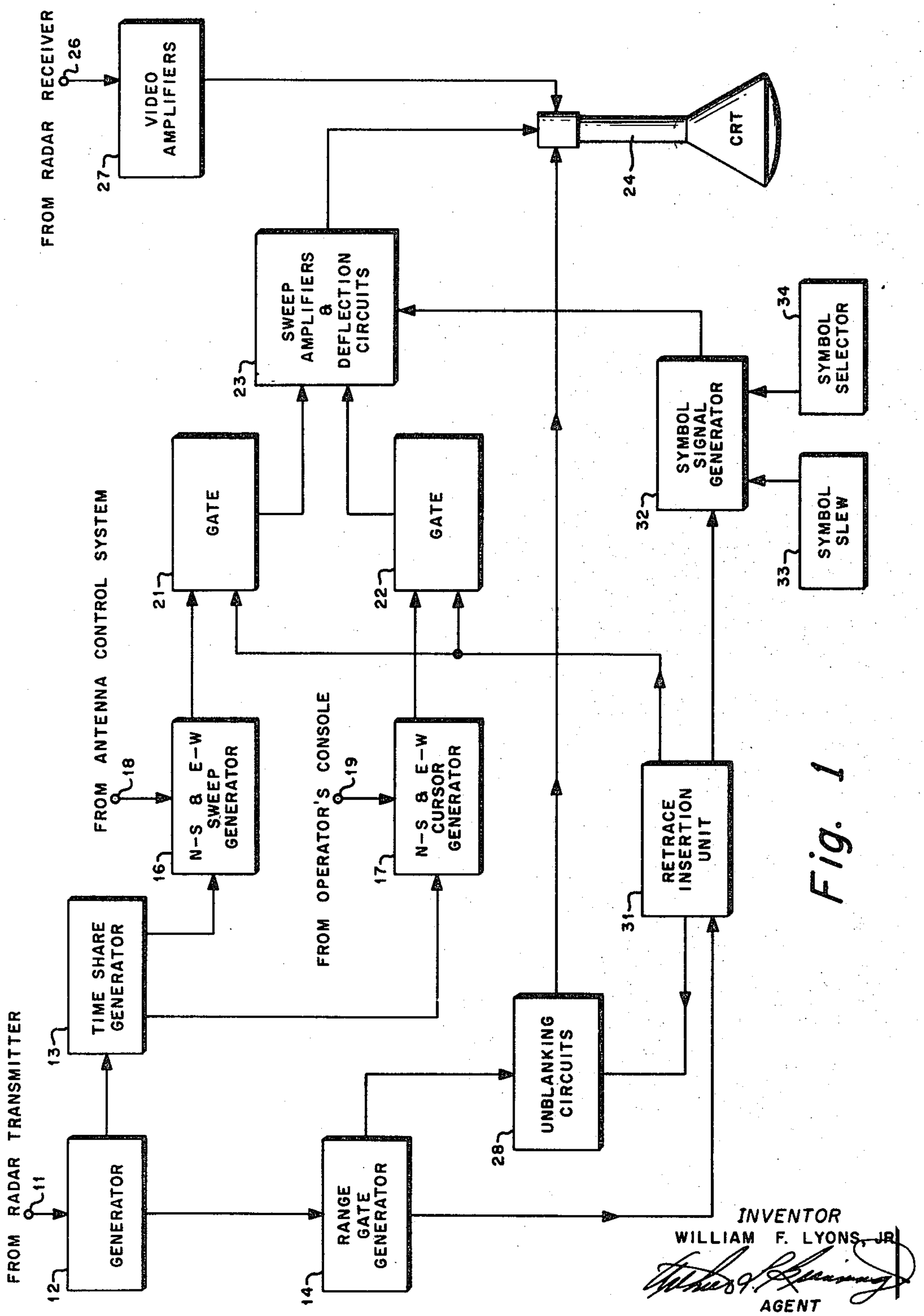
FIG. 1 is a block diagram illustrating the manner in which the present invention may be employed with a typical radar indicating system.

Referring now to FIG. 1, there is shown in generalized form pertinent portions of a typical radar indicating system of the time sharing type. Portions of the radar and radar indicating systems not necessary for an understanding of the present invention have been omitted for simplicity.

Radar system triggers from a radar transmitter (not shown) are applied to a terminal 11 and coupled to a generator 12 which supplies trigger pulses of appropriate character to a time share generator 13 and a range gate generator 14, respectively. Time share generator 13 functions to provide enabling signals selectively to a conventional sweep generator 16 or to a cursor generator or generators 17. As is well known in the art, sweep generator 16 may be controlled by signals representing antenna position applied to terminal 18 from the radar antenna control system (not shown) whereas cursor generator or generators 17 may be controlled in accordance with signals applied to terminal 19 from the system operator's console (not shown). The signals from sweep and cursor generators 16, 17 are coupled respectively through normally open gates 21, 22 to the sweep amplifiers and deflection circuits 23 of a cathode ray tube 24. Video from a radar receiver (not shown) is applied to a terminal 26 and coupled through video amplifiers 27 in a conventional manner to cathode ray tube 24. Range gate generator 14 functions to provide a gating signal to the unblanking or beam intensifying circuits 28 of cathode ray tube 24 to permit video to be displayed upon the screen of the cathode ray tube for a time period representing a selected target range. The portions of FIG. 1 thus far described relate to conventional radar and radar indicating systems and will not therefore be further described.

According to the invention, a retrace insertion unit 31 is provided and coupled to range gate generator 14 to be energized at the termination of the range gate signal therefrom which in typical radar indicating systems of the type shown in FIG. 1 coincides with the beginning of the sweep retrace interval. Retrace insertion unit 31 thereupon functions to provide during the sweep retrace interval a brightening pulse to unblanking circuits 28 to unblank the cathode ray tube, a disabling pulse to gates 21, 22 to isolate the indicator from sweep and cursor generators 16, 17, and an enabling pulse or pulses to a symbol signal generator 32, the operation of which is further controlled by symbol slewing and symbol selecting circuitry 33, 34 in a manner to be more fully explained below. The output signals from symbol signal generator 32 are coupled in a conventional manner to sweep amplifiers and deflection circuits 23 of cathode ray tube 24.

Figure 2:
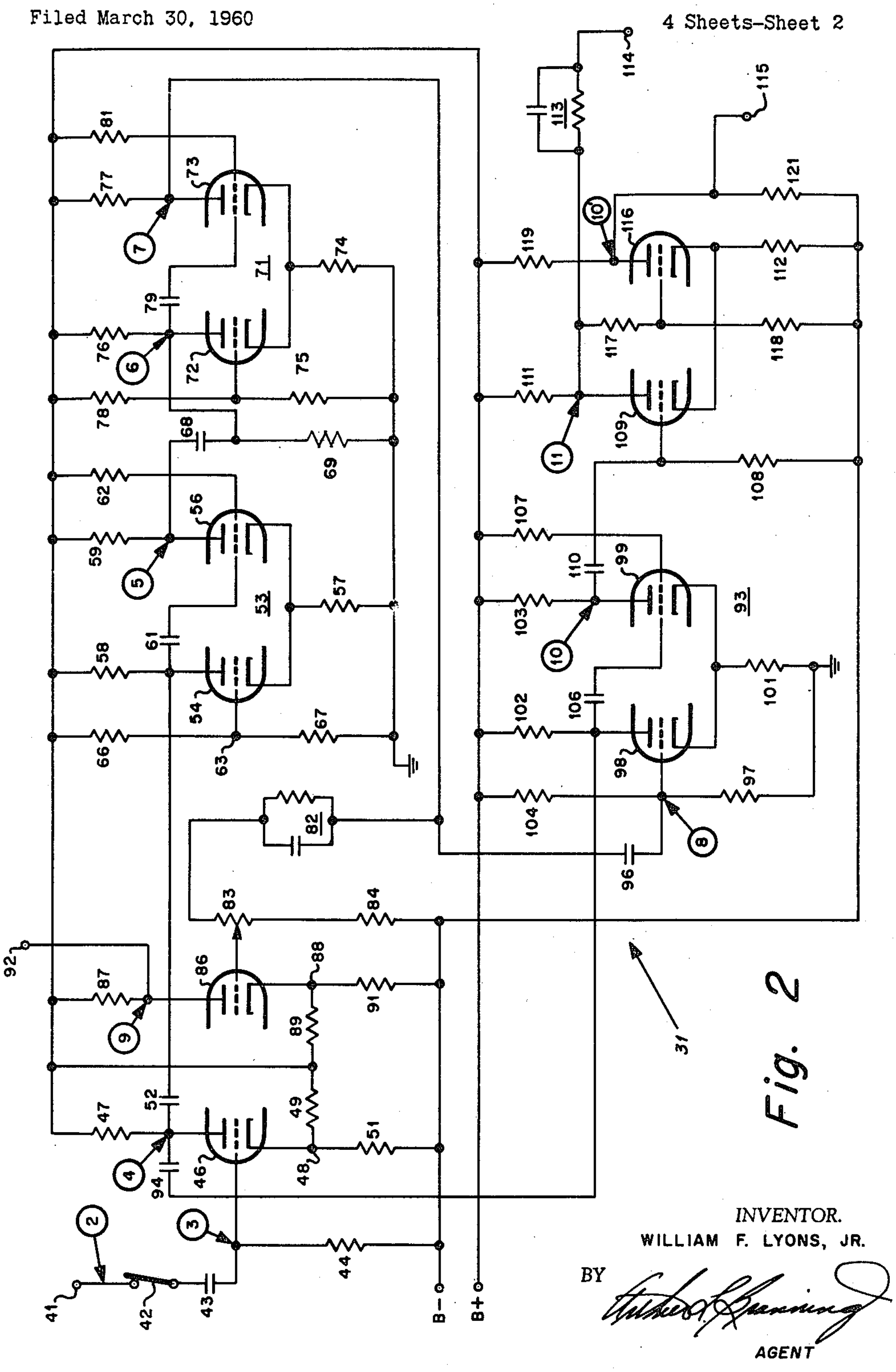
FIG. 2 is a circuit diagram of one embodiment of a retrace insertion unit constructed in accordance with the present invention.
Figure 3:
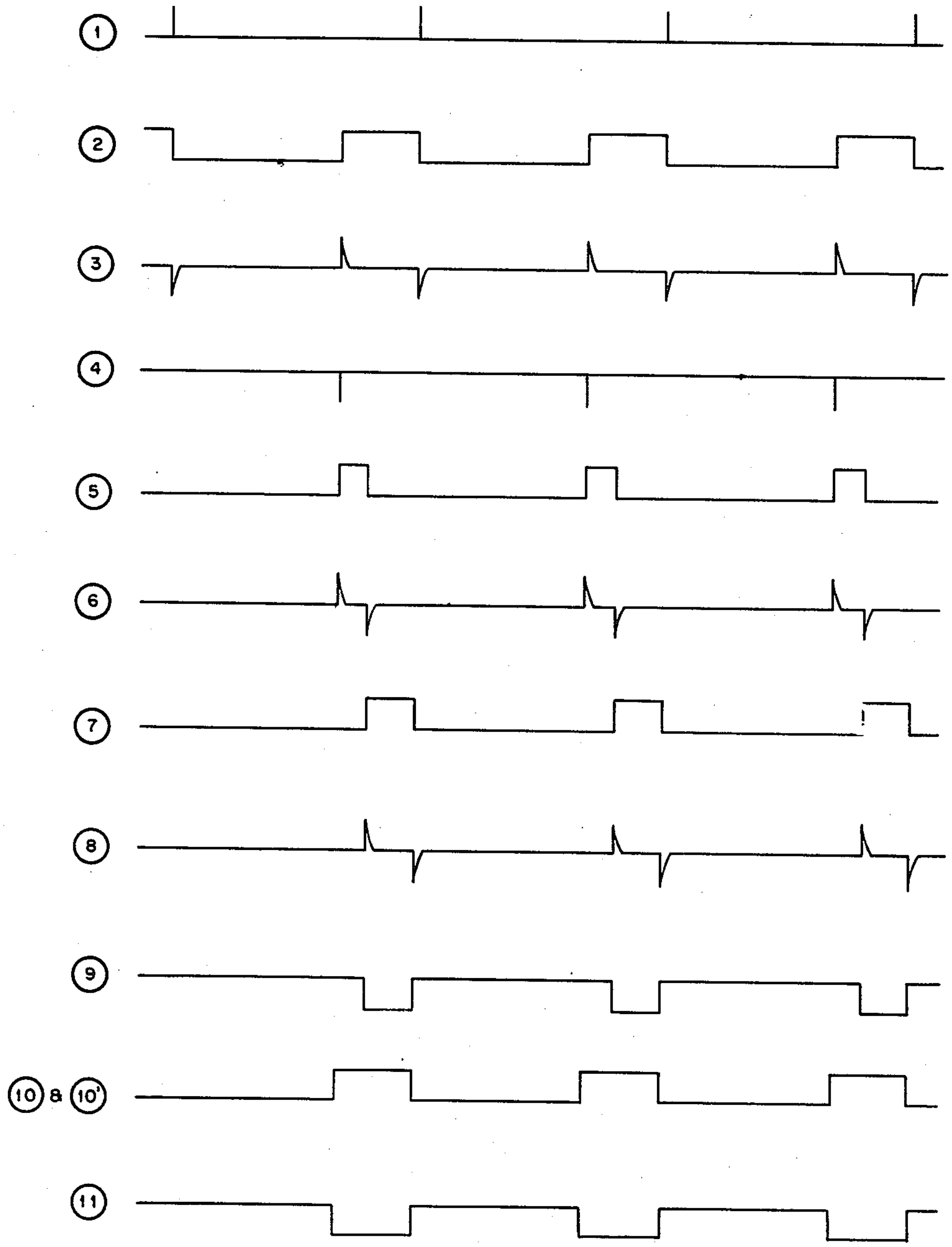
FIG. 3 depicts various exemplary waveforms occurring in the circuit of FIG. 2; and, FIG. 4 is a circuit diagram of a symbol signal generator constructed in accordance with the present invention.

An illustrative embodiment of retrace insertion unit 31 is shown in circuit diagram form in FIG. 2. The following description thereof may be best understood by reference to FIG 3 which illustrates exemplary waveforms occurring therein. The numbering of the waveforms in FIG. 3 corresponds to the circled numerals applied to various portions of the circuit of FIG. 2 to indicate the place where each waveform occurs. Waveform ① of FIG. 3 represents the signals from trigger generator 12 applied to range gate generator 14 while waveform ② represents the negative range gate signal from the range gate generator. Neither trigger generator 12 nor range gate generator 14 is shown in FIG. 2.

Referring now to FIG. 2, the negative range gate from range gate generator 14 is applied to a terminal 41 and coupled through a switch 42 and a differentiating circuit comprising a capacitor 43 and a grid load resistor 44 to the grid of a triode amplifier 46. The anode of triode amplifier 46 is coupled through anode resistor 47 to B+ while the cathode thereof is coupled to the common terminal 48 of a pair of resistors 49, 51 which comprise a voltage divider coupled between B+ and B− to provide proper bias for amplifier 46.

The cathode bias applied to triode 46 is selected to maintain the tube at cut-off except upon receipt of a positive pulse from differentiator 43, 44. Thus amplifier 46 conducts only for a brief period occurring at the termination of the negative range gate signal.

The negative pulse output signal from amplifier 46, which comprises the basic timing signal for the retrace insertion unit, is coupled through a capacitor 52 to a delay multivibrator of the monostable type generally indicated by the reference numeral 53. Delay multivibrator 53 comprises a pair of triodes 54, 56 with the cathodes thereof coupled in common through a resistor 57 to ground and the anodes thereof respectively coupled through anode resistors 58, 59 to B+. The anode of triode 54 and the grid of triode 56 are cross-coupled through an R-C timing circuit comprising a capacitor 61 and a resistor 62 having one terminal connected to B+. The grid of triode 54 is coupled to terminal 63 of a voltage divider comprising resistors 66, 67 coupled between B+ and ground to establish the bias level thereof.

Upon receipt of a negative pulse from amplifier 46, normally conducting triode 56 is rendered non-conductive and normally non-conducting triode 54 is rendered conductive initiating a positive output pulse at the anode of triode 56 having a duration determined by the time constant of R-C network 61, 62.

The output signal from multivibrator 53 is coupled through a differentiating circuit comprising a capacitor 68 and a grid load resistor 69 to a brightening pulse monostable multivibrator generally indicated by the reference numeral 71. Multivibrator 71 is generally similar to multivibrator 53 and comprises a pair of triodes 72, 73 provided with a common cathode resistor 74, anode resistors 76, 77, a bias network comprising resistors 78, 75 and an R-C timing network comprising capacitor 79 and resistor 81. Triode 73 is normally conductive and triode 72 is normally non-conductive.

A square wave output signal is initiated at the anode of triode 73 at the termination of the signal from delay multivibrator 53 at which time a negative pulse is coupled to the grid of triode 73 from differentiator 68, 69. The duration of the square wave is determined by the time constant of R-C network 79, 81.

The output signal from multivibrator 71 is coupled through a wave shaping network 82, a potentiometer 83, and a resistor 84, connected to B−, and applied to the grid of a triode amplifier 86 provided with an anode resistor 87 coupled to B+ and having the cathode thereof coupled to terminal 88 of a bias network comprising resistors 89, 91 coupled between B+ and B−. The output signal from amplifier 86 is applied to terminal 92 which is adapted to be coupled to unblanking circuit 28 (FIG. 1).

A switch gate monostable multivibrator generally indicated by the reference numeral 93 has one input coupled through a capacitor 94 to receive the negative timing signal from amplifier 46 and another input coupled through a differentiating network comprising a capacitor 96 and a grid load resistor 97 to receive the output signal from brightening pulse multivibrator 71. Switch gate multivibrator 93 is similar to multivibrators 53, 71 and comprises a pair of triodes 98, 99 provided with a common cathode resistor 101, anode resistors 102, 103, a grid bias network comprising resistors 104, 97, and an R-C timing circuit comprising a capacitor 106 and a resistor 107. Triode 99 is normally conductive and triode 98 is normally non-conductive.

Receipt of the negative timing signal from amplifier 46 initiates a positive square wave output signal at the anode of triode 99 which persists until a negative pulse is received from differentiator 96, 97 coincidently with the termination of the brightening pulse from multivibrator 71. The natural period of multivibrator 93 is selected to be slightly in excess of the time interval between the occurrence of the timing signal and the termination of the brightening pulse to permit pulse duration control by brightening pulse multivibrator 71.

The modes of operation of multivibrators 71, 93 have not been described in detail since, as may be apparent, they are similar to that of multivibrator 53, described in detail above.

The output signal from multivibrator 93 is coupled through a coupling capacitor 110 and applied across a grid load resistor 108 to the grid of a triode amplifier 109 provided with an anode resistor 111 coupled to B+ and a cathode resistor 112 coupled to B−. The amplified negative switch gate output signal from triode amplifier 109 is coupled through a wave shaping network 113 and applied to a terminal 114 which may be coupled to gates 21, 22 (FIG. 1), and is further coupled to the grid of a second triode amplifier 116 through a coupling resistor 117 and a grid load resistor 118. Resistors 111, 117, and 118 further function to provide a bias network for amplifier 116. The cathode of amplifier 116 is coupled through the cathode resistor 112 of amplifier 109 to B− while the anode thereof is coupled through an anode resistor 119 to B+. The amplified positive switch gate signal 10' is applied from amplifier 116 across a load resistor 121 to terminal 115 to control the operation of the symbol signal generator 32 as will be better understood from the description of an embodiment thereof to be set forth below in connection with FIG. 4.

Figure 4:
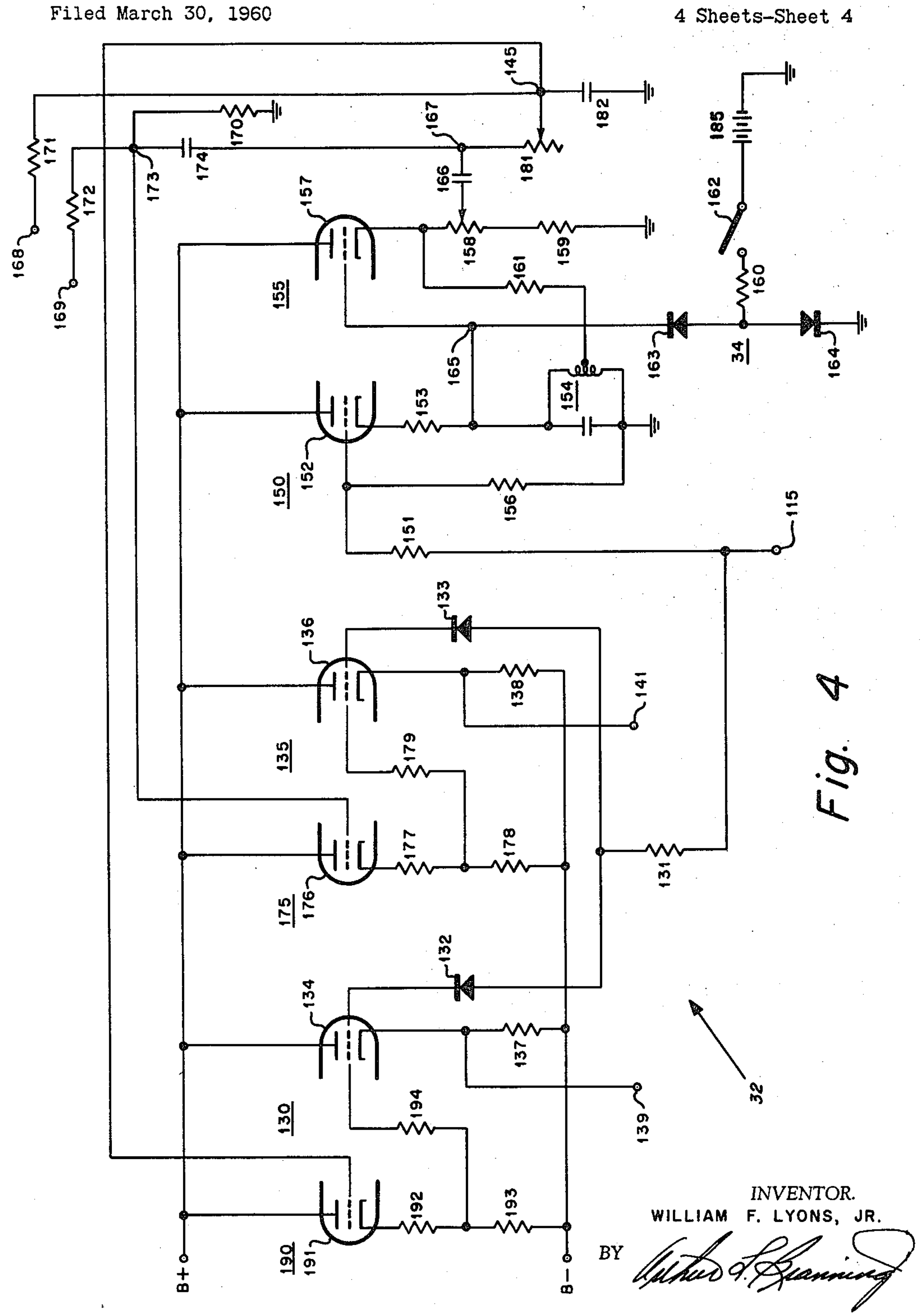

Referring now to FIG. 4, which in circuit diagram form illustrates an embodiment of the symbol signal generator 32 and associated circuitry, it may be seen that the positive switch gate from retrace insertion unit 31, applied to terminal 115, is coupled through a resistor 131 and respectively through a pair of diodes 132, 133 to the grid circuits of a pair of gated cathode followers 130, 135 including triode envelopes 134, 136 and cathode load resistors 137, 138. The anodes of triodes 134, 136 are directly connected to B+ whereas the cathodes thereof are respectively coupled to a pair of output terminals 139, 141 adapted to be coupled to the sweep amplifiers and deflection circuits 23 of cathode ray tube 24 (FIG. 1). It will be understood that, except during the persistence of the positive switch gate, triodes 134, 136 are maintained non-conductive by the negative potential appearing at the anode of amplifier 116 (FIG. 2) and coupled to the grids of triodes 134, 136 through diodes 132, 133.

It will be understood that the sweep amplifiers and deflection circuits 23 comprise two channels, sometimes identified as a north-south and an east-west channel, for orthogonal control of the beam of cathode ray tube 24.

The positive switch gate applied to terminal 115 is further coupled through a resistor 151 to the grid of a triode 152 which, together with cathode resistor 153, tank circuit 154, and bias resistor 156, comprises a gated sine wave oscillator 150.

The output signal from oscillator 150 is coupled to a terminal 165 and to the grid of a triode 157 which together with potentiometer 158 and resistor 159 comprises a cathode follower circuit 155. A cathode follower output terminal 167 is coupled through a capacitor 166 to the wiper arm of potentiometer 158.

To improve the wave shape of the signal from the sine wave oscillator, a resistor 161 may be coupled between the cathode of triode 157 and a tap on the inductor of tank circuit 154 to provide a small amount of negative feedback.

Symbol selector 34 is shown in FIG. 4 as comprising a battery 185, a manually operable switch 162, a current limiting resistor 160, and a pair of diodes 163, 164. Operation of switch 162 to a closed position applies a positive potential to the anodes of diodes 163, 164 effectively placing terminal 165 at ground potential, current flow through diodes 163, 164 decreasing the effective impedances thereof substantially to zero. With switch 162 open, diodes 163, 164 present a substantially open circuit impedance between terminal 165 and ground. Placing terminal 165 at ground potential disables oscillator 150 by short circuiting tank circuit 154 thereof and further operates to bias cathode follower 155 to cut-off, isolating oscillator 150 from terminal 167.

D.C. positioning voltages from marker slew 33 (FIG.

1) are applied to terminals 168, 169 and respectively coupled through resistors 171, 172 to terminals 145 and 173.

The sine wave signal appearing at terminal 167 is coupled through a phase shifting network comprising a capacitor 174 and a resistor 170 to terminal 173 and applied conjointly with the D.C. positioning voltage applied to terminal 169 to the grid of a triode 176 which together with cathode resistors 177, 178 comprises a buffer cathode follower 175, the output from which is coupled through a resistor 179 to the grid of gated triode 136.

In a similar manner the sine wave signal appearing at terminal 167 is further coupled through a phase shifting network comprising a variable resistor or potentiometer 181 and capacitor 182 to terminal 145 and coupled together with the D.C. positioning voltage applied to terminal 168 to the grid of triode 191 which together with cathode resistors 192, 193 comprises a buffer cathode follower 190, the output signal from which is coupled through a resistor 194 to the grid of gated triode 134.

Phase shifting network 174, 170 and phase shifting network 181, 182 together function to shift the phase of the sine wave signal applied to triode 176 ninety degrees with respect to the sine wave signal applied to triode 191.

It will be appreciated that symbol generating and deflection or positioning signals appear respectively at terminals 139, 141 only during the interval that a positive switch gate is applied to terminal 115. If during this interval oscillator 150 is disabled and cathode follower 155 is cut off, only D.C. positioning voltages will appear at terminals 139, 141.

Application of the phase shifted sine wave signals and the D.C. positioning voltages to the deflection circuits of cathode ray tube 24, if the tube is unblanked at this time, will cause a slewable circle to be displayed on the screen thereof. Application of positioning voltages alone at this time will cause a slewable spot to be displayed on the screen.

*Operation*

As mentioned above, upon termination of the negative range gate from range gate generator 14, amplifier 46 functions to provide a negative trigger to initiate a delay pulse in multivibrator 53. The duration of the delay pulse is determined by the time constant of R-C timing circuit 61, 62 and is selected to persist for an interval sufficient to permit the yoke of cathode ray tube 24 to recover from the modulation applied thereto during the normal sweep interval. At the termination of the delay pulse, a brightening pulse is initiated by multivibrator 71 and applied in inverted form from amplifier 86 to unblanking circuit 28 to persist for the remainder of the retrace interval to permit display of a selected symbol during this period. Beam intensity in cathode ray tube 24 is controlled by the setting of potentiometer 83.

The negative pulse from amplifier 46 is further applied to initiate generation of a switch gate pulse in multivibrator 93 which is terminated coincidently with the termination of the brightening pulse, thus persisting for the entire retrace interval.

During the retrace interval, the amplified negative switch gate signal from amplifier 109 is applied to gates 21, 22 to isolate the cathode ray tube from the normal control circuitry thereof, thus preventing any undesirable interaction. If desired, by the provision of an additional gate, video amplifiers 27 may be similarly isolated from the cathode ray tube.

A positive switch gate signal from amplifier 116 is applied to symbol signal generator 32 simultaneously with the application of the negative switch gate signal to gates 21, 22 to activate the symbol signal generator during the retrace interval.

Thus, oscillator 150, normally inactive, is gated into oscillation by the positive switch gate applied to terminal 115, while the positive switch gate applied to terminal 115 further functions to gate on cathode followers 130, 135 thereby permitting symbol generating and slew signals to be coupled to terminals 139, 141 and applied to the sweep amplifiers and deflection circuits 23 of the cathode ray tube 124 during the duration of the switch gate.

If it is desired to display a slewable circle during this interval, manually operable switch 162 is opened to permit ninety degree phase displaced sine wave signals to be respectively coupled along with D.C. slewing voltages to buffer amplifiers 190, 175 and through gated cathode followers 130, 135 to terminals 139, 141 during the retrace interval.

Circle size is controlled by the setting of potentiometer 158 while circularity is controlled by the setting of potentiometer 181. The operating frequency of oscillator 150 is selected to be at least high enough to permit generation of a complete circle during the brightening pulse interval.

If it is desired to merely display a slewable spot, manually operable switch 162 may be closed and only D.C. positioning signals will be coupled to the cathode ray tube 124.

The D.C. symbol slewing signals may be derived from a manually variable voltage source or may be varied automatically as by operation of a magnetron beam switching tube or the like having coupled thereto various preselected D.C. voltage levels, or the slewing signals may be derived from a programmed source.

In like manner the application of a positive potential to diodes 163, 164 to provide for symbol selection may be controlled by a magnetron beam switching tube or the positive potential applied to the diodes may likewise be derived from a programmed source.

Obviously many modifications and variations of the present invention are possible in the light of the above teachings. It is therefore to be understood that within the scope of the appended claims, the invention may be practiced otherwise than as specifically described.

What is claimed is:

1. Apparatus for use with a cathode ray tube indicator provided with a beam deflection control means and a beam intensity control means comprising: a gate generator providing a gate signal, a first terminal coupled to said gate generator; trigger generating means coupled to said first terminal operable to generate a pulse upon termination of the gate signal; first pulse generating means coupled to said trigger generating means operable to generate a first square wave of selected duration initiating with the generation of said trigger pulse; second pulse generating means coupled to said first pulse generating means operable to generate a second square wave of selected duration initiating upon termination of said first square wave; a second terminal coupled to said second pulse generating means and coupled to said beam intensity control means; third pulse generating means coupled to said trigger generating means and to said second pulse generating means operable to generate a third square wave initiating with the generation of said trigger pulse and terminating with the termination of said second square wave; third terminal means coupled to said third pulse generating means and coupled to said beam deflection control means.

2. Apparatus for use with a cathode ray tube indicator provided with a beam deflection control means and a beam intensity control means comprising: a gate generator providing a gate signal, a first terminal coupled to said gate generator; trigger generating means coupled to said first terminal and operable to generate a trigger pulse upon termination of said gate signal; a first monostable multivibrator having an input circuit coupled to said trigger generating means and an output circuit; a second monostable multivibrator having a differentiating circuit in the input circuit thereof coupled to the output circuit of said first multivibrator and an output circuit; a second terminal coupled to the output circuit of said second multivibrator and coupled to said beam intensity control means; a third monostable multivibrator having a first input circuit coupled to said trigger generating means, a second input circuit including differentiating means coupled to the output circuit of said second multivibrator, and an output circuit; third terminal means coupled to the output circuit of said third multivibrator and coupled to said beam deflection control means.

3. Apparatus for use with a cathode ray tube indicator provided with a beam deflection control means and a beam intensity control means comprising: a gate generator providing a gate signal, a first terminal coupled to said gate generator; first amplifier means coupled through a differentiating circuit to said first terminal and operable to provide a trigger pulse upon termination of said gate signal; a first monostable multivibrator having an input circuit coupled to said first amplifier means and an output circuit; a second monostable multivibrator having a differentiating circuit in the input circuit thereof coupled to the output circuit of said first multivibrator and an output circuit; a second terminal coupled to said beam intensity control means; second amplifier means having an input circuit including a potentiometer and a wave shaping network coupled to the output circuit of said second multivibrator and an output circuit coupled to said second terminal; a third monostable multivibrator having a first input circuit coupled to said first amplifier means, a second input circuit including differentiating means coupled to the output circuit of said second multivibrator, and an output circuit; third terminal means coupled to said beam deflection control means; third amplifier means having an input circuit coupled to the output circuit of said third multivibrator and an output circuit coupled to said third terminal means; a fourth terminal; and fourth amplifier means having an input circuit coupled to the output circuit of said third amplifier means and an output circuit coupled to said fourth terminal.

4. Apparatus comprising: a sine wave oscillator including a first triode and a tuned oscillatory circuit coupled in series with a resistor between the cathode of said first triode and a point of reference potential; a first terminal connected to a source of gating signals; circuit means coupling the grid of said first triode to said first terminal; a cathode follower comprising a second triode, a resistor coupled between the cathode of said second triode and said point of reference potential, and a second terminal coupled to said cathode follower resistor; negative feedback means comprising a resistor coupled between the cathode of said second triode and a portion of said tuned circuit; circuit means coupling the grid of said second triode and said tuned circuit to a common terminal; a disabling circuit comprising first and second diodes having the anodes thereof connected together, circuit means connecting the cathode of said first diode to said common terminal, circuit means coupling the cathode of said second diode to said point of reference potential, and means to selectively apply a positive potential to the anodes of said diodes; third and fourth terminals coupled to the deflection system of a cathode ray tube; first phase shifting means comprising a resistor connected between said second and third terminals and a capacitor connected between said third terminal and said point of reference potential; and second phase shifting means comprising a capacitor connected between said second and fourth terminals and a resistor connected between said fourth terminal and said point of reference potential.

5. Apparatus comprising: a sine wave oscillator including a first triode and a tuned oscillatory circuit coupled in series with a resistor between the cathode of said first triode and a point of reference potential; a first terminal connected to a source of gating signals; circuit means coupling the grid of said first triode to said first terminal; a cathode follower comprising a second triode, a resistor coupled between the cathode of said second triode and said point of reference potential, and a second terminal coupled to said cathode follower resistor; negative feedback means comprising a resistor coupled between the cathode of said second triode and a portion of said tuned circuit; circuit means coupling the grid of said second triode and said tuned circuit to a common terminal; a disabling circuit comprising first and second diodes having the anodes thereof connected together, circuit means connecting the cathode of said first diode to said common terminal, circuit means coupling the cathode of said second diode to said point of reference potential, and means to selectively apply a positive potential to the anodes of said diodes; third and fourth terminals coupled to the deflection system of a cathode ray tube; first phase shifting means comprising a resistor connected between said second and third terminals and a capacitor connected between said third terminal and said point of reference potential; second phase shifting means comprising a capacitor connected between said second and fourth terminals and a resistor connected between said fourth terminal and said point of reference potential; means to apply a first variable direct voltage to said third terminal; and means to apply a second variable direct voltage to said fourth terminal.

6. Apparatus comprising: a sine wave oscillator including a first triode and a tuned oscillatory circuit coupled in series with a resistor between the cathode of said first triode and a point of reference potential; a first terminal connected to a source of gating signals; circuit means coupling the grid of said first triode to said first terminal; a cathode follower comprising a second triode, a potentiometer resistor coupled between the cathode of said second triode and said point of reference potential, and a second terminal coupled to the wiper of said potentiometer resistor; negative feedback means comprising a resistor coupled between the cathode of said second triode and a portion of said tuned circuit; circuit means coupling the grid of said second triode and said tuned circuit to a common terminal; a disabling circuit comprising first and second diodes having the anodes thereof connected together, circuit means connecting the cathode of said first diode to said common terminal, circuit means coupling the cathode of said second diode to said point of reference potential, and means to selectively apply a positive potential to the anodes of said diodes; third and fourth terminals; first phase shifting means comprising a variable resistor connected between said second and third terminals and a capacitor connected between said third terminal and said point of reference potential; second phase shifting means comprising a capacitor connected between said second and fourth terminals and a resistor coupled between said fourth terminal and said point of reference potential; means to apply a first variable direct voltage to said third terminal; means to apply a second variable direct voltage to said fourth terminal; a first gated cathode follower comprising a third triode provided with a cathode resistor connected to another point of reference potential, and circuit means including a diode coupled to the grid of said third triode and to said first terminal; first buffer amplifier means further coupling the grid of said third triode to said third terminal; a second gated cathode follower comprising a fourth triode provided with a cathode resistor connected to said other point of reference potential, and circuit means including a diode coupled to the grid of said fourth triode and to said first terminal; second buffer amplifier means further coupling the grid of said fourth triode to said fourth terminal; first and second output terminals coupled to the deflection system of a cathode ray tube; and circuit means respectively coupling the cathode resistors of said first and second gated cathode followers to said first and second output terminals.

7. In a radar indicating system including a gate generator and a cathode ray tube indicator coupled through a beam intensity control means to said gate generator and having a beam deflection system coupled to a beam deflection control means, the apparatus improvement which comprises: a first terminal coupled to said gate generator; trigger generating means coupled to said first terminal operable to generate a pulse upon termination of the gate signal; first pulse generating means coupled to said trigger generating means operable to generate a first square wave of selected duration initiating with the generation of said trigger pulse; second pulse generating means coupled to said first pulse generating means operable to generate a second square wave of selected duration initiating upon termination of said first square wave; a second terminal coupled to said second pulse generating means and coupled to said beam intensity control means; third pulse generating means coupled to said trigger generating means and to said second pulse generating means operable to generate a third square wave initiating with the generation of said trigger pulse and terminating with the termination of said second square wave; a third terminal coupled to said third pulse generating means and coupled to said beam deflection control means; a fourth terminal coupled to said third pulse generating means; a sine wave oscillator including a triode and a tuned oscillatory circuit coupled in series with a cathode resistor between the cathode of said triode and a point of reference potential; circuit means coupling the grid of said triode to said fourth terminal; a fifth terminal; circuit means coupling said fifth terminal to said tuned circuit; sixth and seventh terminals coupled to the deflection system of said cathode ray tube; first phase shifting means comprising a resistor connected between said fifth and sixth terminals and a capacitor connected between said sixth terminal and said point of reference potential; second phase shifting means comprising a capacitor connected between said fifth and seventh terminals and a resistor connected between said seventh terminal and said point of reference potential; and means to disable said oscillator.

8. In a radar indicating system including a gate generator and a cathode ray tube indicator coupled through a beam intensity control means to said gate generator and having a beam deflection system coupled to a beam deflection control means, the apparatus improvement which comprises: a first terminal coupled to said gate generator; trigger generating means coupled to said first terminal operable to generate a pulse upon termination of the gate signal; first pulse generating means coupled to said trigger generating means operable to generate a first square wave of selected duration initiating with the generation of said trigger pulse; second pulse generating means coupled to said first pulse generating means operable to generate a second square wave of selected duration initiating upon termination of said first square wave; a second terminal coupled to said second pulse generating means and coupled to said beam intensity control means; third pulse generating means coupled to said trigger generating means and to said second pulse generating means operable to generate a third square wave initiating with the generation of said trigger pulse and terminating with the termination of said second square wave; a third terminal coupled to said third pulse generating means and coupled to said beam deflection control means; a fourth terminal coupled to said third pulse generating means; a sine wave oscillator including a first triode and a tuned oscillatory circuit coupled in series with a resistor between the cathode of said first triode and a point of reference potential; circuit means coupling the grid of said first triode to said fourth terminal; a cathode follower comprising a second triode, a resistor coupled between the cathode of said second triode and said point of reference potential, and a fifth terminal coupled to said cathode follower resistor; negative feedback means comprising a resistor coupled between the cathode of said second triode and a portion of said tuned circuit; circuit means coupling the grid of said second triode and said tuned circuit to a common terminal; means coupled to said common terminal to disable said oscillator; sixth and seventh terminals coupled to the deflection system of said cathode ray tube; first phase shifting means comprising a resistor connected between said fifth and sixth terminals and a capacitor connected between said sixth terminal and said point of reference potential; and second phase shifting means comprising a capacitor connected between said fifth and seventh terminals and a resistor connected between said seventh terminal and said point of reference potential.

9. In a radar indicating system including a gate generator and a cathode ray tube indicator coupled through a beam intensity control means to said gate generator and having a beam deflection system coupled to a beam deflection control means, the apparatus improvement which comprises: a first terminal coupled to said gate generator; trigger generating means coupled to said first terminal operable to generate a pulse upon termination of the gate signal; first pulse generating means coupled to said trigger generating means operable to generate a first square wave of selected duration initiating with the generation of said trigger pulse; second pulse generating means coupled to said first pulse generating means operable to generate a second square wave of selected duration initiating upon termination of said first square wave; a second terminal coupled to said second pulse generating means and adapted to be coupled to said unblanking circuit; third pulse generating means coupled to said trigger generating means and to said second pulse generating means operable to generate a third square wave initiating with the generation of said trigger pulse and terminating with the termination of said second square wave; a third terminal coupled to said third pulse generating means and coupled to said beam deflection control means; a fourth terminal coupled to said third pulse generating means; a sine wave oscillator including a first triode and a tuned oscillatory circuit coupled in series with a resistor between the cathode of said first triode and a point of reference potential; circuit means coupling the grid of said first triode to said fourth terminal; a cathode follower comprising a second triode, a resistor coupled between the cathode of said second triode and said point of reference potential, and a fifth terminal coupled to said cathode follower resistor; negative feedback means comprising a resistor coupled between the cathode of said second triode and a portion of said tuned circuit; circuit means coupling the grid of said second triode and said tuned circuit to a common terminal; a disabling circuit comprising first and second diodes having the anodes thereof connected toegther, circuit means connecting the cathode of said first diode to said common terminal, circuit means coupling the cathode of said second diode to said point of reference potential, and means to selectively apply a positive potential to the anodes of said diodes; sixth and seventh terminals coupled to the deflection system of said cathode ray tube; first phase shifting means comprising a resistor connected between said fifth and sixth terminals and a capacitor connected between said sixth terminal and said point of reference potential; and second phase shifting means comprising a capacitor connected between said fifth and seventh terminals and a resistor connected between said seventh terminal and said point of reference potential.

10. In a radar indicating system including a gate generator and a cathode ray tube indicator coupled through a beam intensity control means to said gate generator and having a beam deflection system coupled to a beam deflection control means, the apparatus improvement which comprises: a first terminal coupled to said gate generator; trigger generating means coupled to said first terminal operable to generate a pulse upon termination of the gate signal; first pulse generating means coupled to said trigger generating means operable to generate a first square wave of selected duration initiating with the generation of said trigger pulse; second pulse generating means coupled to said first pulse generating means operable to generate a second square wave of selected duration initiating upon termination of said first square wave; a second terminal coupled to said second pulse generating means and coupled to said beam intensity control means; third pulse generating means coupled to said trigger generating means and to said second pulse generating means operable to generate a third square wave initiating with the generation of said trigger pulse and terminating with the termination of said second square wave; a third terminal coupled to said third pulse generating means and coupled to said beam deflection control means; a fourth terminal coupled to said third pulse generating means; a sine wave oscillator including a first triode and a tuned oscillatory circuit coupled in series with a resistor between the cathode of said first triode and a point of reference potential; circuit means coupling the grid of said first triode to said fourth terminal; a cathode follower comprising a second triode, a resistor coupled between the cathode of said second triode and said point of reference potential, and a fifth terminal coupled to said cathode follower resistor; negative feedback means comprising a resistor coupled between the cathode of said second triode and a portion of said tuned circuit; circuit means coupling the grid of said second triode and said tuned circuit to a common terminal; a disabling circuit comprising first and second diodes having the anodes thereof connected together, circuit means connecting the cathode of said first diode to said common terminal circuit means coupling the cathode of said second diode to said point of reference potential, and means to selectively apply a positive potential to the anodes of said diodes; sixth and seventh terminals coupled to the deflection system of said cathode ray tube; first phase shifting means comprising a resistor connected between said fifth and sixth terminals and a capacitor connected between said sixth terminal and said point of reference potential; and second phase shifting means comprising a capacitor connected between said fifth and seventh terminals and a resistor connected between said seventh terminal and said point of reference potential; means to apply a first variable direct voltage to said sixth terminal; and means to apply a second variable direct voltage to said seventh terminal.

11. In a radar indicating system including a gate generator and a cathode ray tube indicator coupled through a beam intensity control means to said gate generator and having a beam deflection system coupled to a beam deflection control means, the apparatus improvement which comprises: a first terminal coupled to said gate generator; trigger generating means coupled to said first terminal operable to generate a pulse upon termination of the gate signal; first pulse generating means coupled to said trigger generating means operable to generate a first square wave of selected duration initiating with the generation of said trigger pulse; second pulse generating means coupled to said first pulse generating means operable to generate a second square wave of selected duration initiating upon termination of said first square wave; a second terminal coupled to said second pulse generating means and coupled to said beam intensity control means; third pulse generating means coupled to said trigger generating means and to said second pulse generating means operable to generate a third square wave initiating with the generation of said trigger pulse and terminating with the termination of said second square wave; a third terminal coupled to said third pulse generating means and coupled to said beam deflection control means; a fourth terminal coupled to said third pulse generating means; a sine wave oscillator including a first triode and a tuned oscillatory circuit coupled in series with a resistor between the cathode of said first triode and a point of reference potential; circuit means coupling the grid of said first triode to said fourth terminal; a cathode follower comprising a second triode, a potentiometer resistor coupled between the cathode of said second triode and said point of reference potential, and a fifth terminal coupled to the wiper of said potentiometer resistor; negative feedback means comprising a resistor coupled between the cathode of said second triode and a portion of said tuned circuit; circuit means coupling the grid of said second triode and said tuned circuit to a common terminal; a disabling circuit comprising first and second diodes having the anodes thereof connected together, circuit means connecting the cathode of said first diode to said common terminal, circuit means coupling the cathode of said second diode to said point of reference potential, and means to selectively apply a positive potential to the anodes of said diodes; sixth and seventh terminals; first phase shifting means comprising a variable resistor connected between said fifth and sixth terminals and a capacitor connected between said sixth terminal and said point of reference potential; second phase shifting means comprising a capacitor connected between said fifth and seventh terminals and a resistor coupled between said seventh terminal and said point of reference potential; means to apply a first variable direct voltage to said sixth terminal; means to apply a second variable direct voltage to said seventh terminal; a first gated cathode follower comprising a third triode provided with a cathode resistor connected to another point of reference potential, and circuit means including a diode coupled to the grid of said third triode and to said fourth terminal; first buffer amplifier means further coupling the grid of said third triode to said sixth terminal; a second gated cathode follower comprising a fourth triode provided with a cathode resistor connected to said other point of reference potential, and circuit means including a diode coupled to the grid of said fourth triode and to said fourth terminal; second buffer amplifier means further coupling the grid of said fourth triode to said seventh terminal; eighth and ninth terminals coupled to the deflection system of said cathode ray tube; and circuit means respectively coupling the cathode resistors of said first and second gated cathode followers to said eighth and ninth terminals.

12. In a radar indicating system including a gate generator and a cathode ray tube indicator coupled through a beam intensity control means to said gate generator and having a beam deflection system coupled to a beam deflection control means, the apparatus improvement which comprises: a first terminal coupled to said gate generator; trigger generating means coupled to said first terminal and operable to generate a trigger pulse upon termination of said gate signal; a first monostable multivibrator having an input circuit coupled to said trigger generating means and an output circuit; a second monostable multivibrator having a differentiating circuit in the input circuit thereof coupled to the output circuit of said first multivibrator and an output circuit; a second terminal coupled to the output circuit of said second multivibrator and coupled to said beam intensity control means; a third monostable multivibrator having a first input circuit coupled to said trigger generator, a second input circuit including differentiating means coupled to the output circuit of said second multivibrator, and an output circuit; a third terminal coupled to the output circuit of said third multivibrator and coupled to said beam deflection control means; a fourth terminal coupled to the output circuit of said third multivibrator; a sine wave oscillator including a triode and a tuned oscillatory circuit coupled in series with a cathode resistor between the cathode of said triode and a point of reference potential; circuit means coupling the grid of said triode to said fourth terminal a fifth terminal; circuit means coupling said fifth terminal to said tuned circuit; sixth and seventh terminals coupled to the deflection system of said cathode ray tube; first phase shifting means comprising a resistor connected between said fifth and sixth terminals and a capacitor connected between said sixth terminal and said point of reference potential; second phase shifting means comprising a capacitor connected between said fifth and seventh terminals and a resistor connected between said seventh terminal and said point of reference potential; and means to disable said oscillator.

13. In a radar indicating system including a gate generator and a cathode ray tube indicator coupled through a beam intensity control means to said gate generator and having a beam deflection system coupled to a beam deflection control means, the apparatus improvement which comprises: a first terminal coupled to said gate generator; trigger generating means coupled to said first terminal and operable to generate a trigger pulse upon termination of said gate signal; a first monostable multivibrator having an input circuit coupled to said trigger generating means and an output circuit; a second monostable multivibrator having a differentiating circuit in the input circuit thereof coupled to the output circuit of said first multivibrator and an output circuit; a second terminal coupled to the output circuit of said second multivibrator and coupled to said beam intensity control means; a third monostable multivibrator having a first input circuit coupled to said trigger generator, a second input circuit including differentiating means coupled to the output circuit of said second multivibrator, and an output circuit; a third terminal coupled to the output circuit of said third multivibrator and coupled to said beam deflection control means; a fourth terminal coupled to the output circuit of said third multivibrator; a sine wave oscillator including a first triode and a tuned oscillatory circuit coupled in series with a resistor between the cathode of said first triode and a point of reference potential; circuit means coupling the grid of said first triode to said fourth terminal; a cathode follower comprising a second triode, a resistor coupled between the cathode of said second triode and said point of reference potential, and a fifth terminal coupled to said cathode follower resistor; negative feedback means comprising a resistor coupled between the cathode of said second triode and a portion of said tuned circuit; circuit means coupling the grid of said second triode and said tuned circuit to a common terminal; means coupled to said common terminal to disable said oscillator; sixth and seventh terminals coupled to the deflection system of said cathode ray tube; first phase shifting means comprising a resistor connected between said fifth and sixth terminals and a capacitor connected between said sixth terminal and said point of reference potential; and second phase shifting means comprising a capacitor connected between said fifth and seventh terminals and a resistor connected between said seventh terminal and said point of reference potential.

14. In a radar indicating system including a gate generator and a cathode ray tube indicator coupled through a beam intensity control means to said gate generator and having a beam deflection system coupled to a beam deflection control means, the apparatus improvement which comprises: a first terminal coupled to said gate generator; trigger generating means coupled to said first terminal and operable to generate a trigger pulse upon termination of said gate signal; a first monostable multivibrator having an input circuit coupled to said trigger generating means and an output circuit; a second monostable multivibrator having a differentiating circuit in the input circuit thereof coupled to the output circuit of said first multivibrator and an output circuit; a second terminal coupled to the output circuit of said second multivibrator and coupled to said beam intensity control means; a third monostable multivibrator having a first input circuit coupled to said trigger generator, a second input circuit including differentiating means coupled to the output circuit of said second multivibrator, and an output circuit; a third terminal coupled to the output circuit of said third multivibrator and coupled to said beam deflection control means; a fourth terminal coupled to the output circuit of said third multivibrator; a sine wave oscillator including a first triode and a tuned oscillatory circuit coupled in series with a resistor between the cathode of said first triode and a point of reference potential; circuit means coupling the grid of said first triode to said fourth terminal; a cathode follower comprising a second triode, a resistor coupled between the cathode of said second triode and said point of reference potential, and a fifth terminal coupled to said cathode follower resistor; negative feedback means comprising a resistor coupled between the cathode of said second triode and a portion of said tuned circuit; circuit means coupling the grid of said second triode and said tuned circuit to a common terminal; a disabling circuit comprising first and second diodes having the anodes thereof connected together, circuit means connecting the cathode of said first diode to said common terminal, circuit means coupling the cathode of said second diode to said point of reference potential, and means to selectively apply a positive potential to the anodes of said diodes; sixth and seventh terminals coupled to the deflection system of said cathode ray tube; first phase shifting means comprising a resistor connected between said fifth and sixth terminals and a capacitor connected between said sixth terminal and said point of reference potential; and second phase shifting means comprising a capacitor connected between said fifth and seventh terminals and a resistor connected between said seventh terminal and said point of reference potential.

15. In a radar indicating system including a gate generator and a cathode ray tube indicator coupled through a beam intensity control means to said gate generator and having a beam deflection system coupled to a beam deflection control means, the apparatus improvement which comprises: a first terminal coupled to said gate generator; trigger generating means coupled to said first terminal and operable to generate a trigger pulse upon termination of said gate signal; a first monostable multivibrator having an input circuit coupled to said trigger generating means and an output circuit; a second monostable multivibrator having a differentiating circuit in the input circuit thereof coupled to the output circuit of said first multivibrator and an output circuit; a second terminal coupled to the output circuit of said second multivibrator and coupled to said beam intensity control means; a third monostable multivibrator having a first input circuit coupled to said trigger generator, a second input circuit including differentiating means coupled to the output circuit of said second multivibrator, and an output circuit; a third terminal coupled to the output circuit of said third multivibrator and coupled to said beam deflection control means; a fourth terminal coupled to the output circuit of said third multivibrator; a sine wave oscillator including a first triode and a tuned oscillatory circuit coupled in series with a resistor between the cathode of said first triode and a point of reference potential; circuit means coupling the grid of said first triode to said fourth terminal; a cathode follower comprising a second triode, a resistor coupled between the cathode of said second triode and said point of reference potential, and a fifth terminal coupled to said cathode follower resistor; negative feedback means comprising a resistor coupled between the cathode of said second triode and a portion of said tuned circuit; circuit means coupling the grid of said second triode and said tuned circuit to a common terminal; a disabling circuit comprising first and second diodes having the anodes thereof connected together, circuit means connecting the cathode of said first diode to said common terminal, circuit means coupling the cathode of said second diode to said point of reference potential, and means to selectively apply a positive potential to the anodes of said diodes; sixth and seventh terminals coupled to the deflection system of said cathode ray tube; first phase shifting means comprising a resistor connected between said fifth and sixth terminals and a capacitor connected between said sixth terminal and said point of reference potential; and second phase shifting means comprising a capacitor connected between said fifth and seventh terminals and a resistor connected between said seventh terminal and said point of reference potential; means to apply a first variable direct voltage to said sixth terminal; and means to apply a second variable direct voltage to said seventh terminal.

16. In a radar indicating system including a gate generator and a cathode ray tube indicator coupled through a beam intensity control means to said gate generator and having a beam deflection system coupled to a beam deflection control means, the apparatus improvement which comprises: a first terminal coupled to said gate generator; trigger generating means coupled to said first terminal and operable to generate a trigger pulse upon termination of said gate signal; a first monostable multivibrator having an input circuit coupled to said trigger generating means and an output circuit; a second monostable multivibrator having a differentiating circuit in the input circuit thereof coupled to the output circuit of said first multivibrator and an output circuit; a second terminal coupled to the output circuit of said second multivibrator and coupled to said beam intensity control means; a third monostable multivibrator having a first input circuit coupled to said trigger generator, a second input circuit including differentiating means coupled to the output circuit of said second multivibrator, and an output circuit; a third terminal coupled to the output circuit of said third multivibrator and coupled to said beam deflection control means; a fourth terminal coupled to the output circuit of said third multivibrator; a sine wave oscillator including a first triode and a tuned oscillatory circuit coupled in series with a resistor between the cathode of said first triode and a point of reference potential; circuit means coupling the grid of said first triode to said fourth terminal; a cathode follower comprising a second triode, a potentiometer resistor coupled between the cathode of said second triode and said point of reference potential, and a fifth terminal coupled to the wiper of said potentiometer resistor; negative feedback means comprising a resistor coupled between the cathode of said second triode and a portion of said tuned circuit; circuit means coupling the grid of said second triode and said tuned circuit to a common terminal; a disabling circuit comprising first and second diodes having the anodes thereof connected together, circuit means connecting the cathode of said first diode to said common terminal, circuit means coupling the cathode of said second diode to said point of reference potential, and means to selectively apply a positive potential to the anodes of said diodes; sixth and seventh terminals; first phase shifting means comprising a variable resistor connected between said fifth and sixth terminals and a capacitor connected between said sixth terminal and said point of reference potential; second phase shifting means comprising a capacitor connected between said fifth and seventh terminals and a resistor coupled between said seventh terminal and said point of reference potential; means to apply a first variable direct voltage to said sixth terminal; means to apply a second variable direct voltage to said seventh terminal; a first gated cathode follower comprising a third triode provided with a cathode resistor connected to another point of reference potential, and circuit means including a diode coupled to the grid of said third triode and to said fourth terminal; first buffer amplifier means further coupling the grid of said third triode to said sixth terminal; a second gated cathode follower comprising a fourth triode provided with a cathode resistor connected to said other point of reference potential, and circuit means including a diode coupled to the grid of said fourth triode and to said fourth terminal; second buffer amplifier means further coupling the grid of said fourth triode to said seventh terminal; eighth and ninth terminals coupled to the deflection system of said cathode ray tube; and circuit means respectively coupling the cathode resistors of said first and second gated cathode followers to said eighth and ninth terminals.

17. In a radar indicating system including a gate generator and a cathode ray tube indicator coupled through a beam intensity control means to said gate generator and having a beam deflection system coupled to a beam deflection control means, the apparatus improvement which comprises: a first terminal coupled to said gate generator; first amplifier means coupled through a differentiating circuit to said first terminal and operable to provide a trigger pulse upon termination of said gate signal; a first monostable multivibrator having an input circuit coupled to said first amplifier means and an output circuit; a second monostable multivibrator having a differentiating circuit in the input circuit thereof coupled to the output circuit of said first multivibrator and an output circuit; a second terminal coupled to said beam intensity control means; second amplifier means having an input circuit including a potentiometer and a wave shaping network coupled to the output circuit of said second multivibrator and an output circuit coupled to said second terminal; a third monostable multivibrator having a first input circuit coupled to said first amplifier means, a second input circuit including differentiating means coupled to the output circuit of said second multivibrator, and an output circuit; third and fourth terminals; circuit means coupling said third terminal to said beam deflection control means; third amplifier means having an input circuit coupled to the output circuit of said third multivibrator and an output circuit coupled to said third terminal; fourth amplifier means having an input circuit coupled to the output circuit of said third amplifier means and an output circuit coupled to said fourth terminal; a sine wave oscillator including a triode and a tuned oscillatory circuit coupled in series with a cathode resistor between the cathode of said triode and a point of reference potential; circuit means coupling the grid of said triode to said fourth terminal; a fifth terminal; circuit means coupling said fifth terminal to said tuned circuit; sixth and seventh terminals coupled to the deflection system of said cathode ray tube; first phase shifting means comprising a resistor connected between said fifth and sixth terminals and a capacitor connected between said sixth terminal and said point of reference potential; second phase shifting means comprising a capacitor connected between said fifth and seventh terminals and a resistor connected between said seventh terminal and said point of reference potential; and means to disable said oscillator.

18. In a radar indicating system including a gate generator and a cathode ray tube indicator coupled through a beam intensity control means to said gate generator and having a beam deflection system coupled to a beam deflection control means, the apparatus improvement which comprises: a first terminal coupled to said gate generator; first amplifier means coupled through a differentiating circuit to said first terminal and operable to provide a trigger pulse upon termination of said gate signal; a first monostable multivibrator having an input circuit coupled to said first amplifier means and an output circuit; a second monostable multivibrator having a differentiating circuit in the input circuit thereof coupled to the output circuit of said first multivibrator and an output circuit; a second terminal coupled to said beam intensity control means; second amplifier means having an input circuit including a potentiometer and a wave shaping network coupled to the output circuit of said second multivibrator and an output circuit coupled to said second terminal; a third monostable multivibrator having a first input circuit coupled to said first amplifier means, a second input circuit including differentiating means coupled to the output circuit of said second multivibrator, and an output circuit; third and fourth terminals; circuit means coupling said third terminal to said beam deflection control means; third amplifier means having an input circuit coupled to the output circuit of said third multivibrator and an output circuit coupled to said third terminal; fourth amplifier means having an input circuit coupled to the output circuit of said third amplifier means and an output circuit coupled to said fourth terminal; a sine wave oscillator including a first triode and a tuned oscillatory circuit coupled in series with a resistor between the cathode of said first triode and a point of reference potential; circuit means coupling the grid of said first triode to said fourth terminal; a cathode follower comprising a second triode, a resistor coupled between the cathode of said second triode and said point of reference potential, and a fifth terminal coupled to said cathode follower resistor; negative feedback means comprising a resistor coupled between the cathode of said second triode and a portion of said tuned circuit; circuit means coupling the grid of said second triode and said tuned circuit to a common terminal; means coupled to said common terminal to disable said oscillator; sixth and seventh terminals coupled to the deflection system of said cathode ray tube; first phase shifting means comprising a resistor connected between said fifth and sixth terminals and a capacitor connected between said sixth terminal and said point of reference potential; and second phase shifting means comprising a capacitor connected between said fifth and seventh terminals and a resistor connector between said seventh terminal and said point of reference potential.

19. In a radar indicating system including a gate generator and a cathode ray tube indicator coupled through a beam intensity control means to said gate generator and having a beam deflection system coupled to a beam deflection control means, the apparatus improvement which comprises: a first terminal coupled to said gate generator; first amplifier means coupled through a differentiating circuit to said first terminal and operable to provide a trigger pulse upon termination of said gate signal; a first monostable multivibrator having an input circuit coupled to said first amplifier means and an output circuit; a second monostable multivibrator having a differentiating circuit in the input circuit thereof coupled to the output circuit of said first multivibrator and an output circuit; a second terminal coupled to said beam intensity control means; second amplifier means having an input circuit including a potentiometer and a wave shaping network coupled to the output circuit of said second multivibrator and an output circuit coupled to said second terminal; a third monostable multivibrator having a first input circuit coupled to said first amplifier means, a second input circuit including differentiating means coupled to the output circuit of said second multivibrator, and an output circuit; third and fourth terminals; circuit means coupling said third terminal to said beam deflection control means; third amplifier means having an input circuit coupled to the output circuit of said third multivibrator and an output circuit coupled to said third terminal; fourth amplifier means having an input circuit coupled to the output circuit of said third amplifier means and an output circuit coupled to said fourth terminal; a sine wave oscillator including a first triode and a tuned oscillatory circuit coupled in series with a resistor between the cathode of said first triode and a point of reference potential; circuit means coupling the grid of said first triode to said fourth terminal; a cathode follower comprising a second triode, a resistor coupled between the cathode of said second triode and said point of reference potential, and a fifth terminal coupled to said cathode follower resistor; negative feedback means comprising a resistor coupled between the cathode of said second triode and a portion of said tuned circuit; circuit means coupling the grid of said second triode and said tuned circuit to a common terminal; a disabling circuit comprising first and second diodes having the anodes thereof connected together, circuit means connecting the cathode of said first diode to said common terminal, circuit means coupling the cathode of said second diode to said point of reference potential, and means to selectively apply a positive potential to the anodes of said diodes; sixth and seventh terminals coupled to the deflection system of said cathode ray tube; first phase shifting means comprising a resistor connected between said fifth and sixth terminals and a capacitor connected between said sixth terminal and said point of reference potential; and second phase shifting means comprising a capacitor connected between said fifth and seventh terminals and a resistor connected between said seventh terminal and said point of reference potential.

20. In a radar indicating system including a gate generator and a cathode ray tube indicator coupled through a beam intensity control means to said gate generator and having a beam deflection system coupled to a beam deflection control means, the apparatus improvement which comprises: a first terminal coupled to said gate generator; first amplifier means coupled through a differentiating circuit to said first terminal and operable to provide a trigger pulse upon termination of said gate signal; a first monostable multivibrator having an input circuit coupled to said first amplifier means and an output circuit; a second monostable multivibrator having a differentiating circuit in the input circuit thereof coupled to the output circuit of said first multivibrator and an output circuit; a second terminal coupled to said beam intensity control means; second amplifier means having an input circuit including a potentiometer and a wave shaping network coupled to the output circuit of said second multivibrator and an output circuit coupled to said second terminal; a third monostable multivibrator having a first input circuit coupled to said first amplifier means, a second input circuit including differentiating means coupled to the output circuit of said second multivibrator, and an output circuit; third and fourth terminals; circuit means coupling said third terminal to said beam deflection control means; third amplifier means having an input circuit coupled to the output circuit of said third multivibrator and an output circuit coupled to said third terminal; fourth amplifier means having an input circuit coupled to the output circuit of said third amplifier means and an output circuit coupled to said fourth terminal; a sine wave oscillator including a first triode and a tuned oscillatory circuit coupled in series with a resistor between the cathode of said first triode and a point of reference potential; circuit means coupling the grid of said first triode to said fourth terminal; a cathode follower comprising a second triode, a resistor coupled between the cathode of said second triode and said point of reference, and a fifth terminal coupled to said cathode follower resistor; negative feedback means comprising a resistor coupled between the cathode of said second triode and a portion of said tuned circuit; circuit means coupling the grid of said second triode and said tuned circuit to a common terminal; a disabling circuit comprising first and second diodes having the anodes thereof connected together, circuit means connecting the cathode of said first diode to said common terminal, circuit means coupling the cathode of said second diode to said point of reference potential, and means to selectively apply a positive potential to the anodes of said diodes; sixth and seventh terminals coupled to the deflection system of said cathode ray tube; first phase shifting means comprising a resistor connected between said fifth and sixth terminals and a capacitor connected between said sixth terminal and said point of reference potential; and second phase shifting means comprising a capacitor connected between said fifth and seventh terminals and a resistor connected between said seventh terminal and said point of reference potential; means to apply a first variable direct voltage to said sixth terminal; and means to apply a second variable direct voltage to said seventh terminal.

21. In a radar indicating system including a gate generator and a cathode ray tube indicator coupled through a beam intensity control means to said gate generator and having a beam deflection system coupled to a beam deflection control means, the apparatus improvement which comprises: a first terminal coupled to said gate generator; first amplifier means coupled through a differentiating circuit to said first terminal and operable to provide a trigger pulse upon termination of said gate signal; a first monostable multivibrator having an input circuit coupled to said first amplifier means and an output circuit; a second monostable multivibrator having a differentiating circuit in the input circuit thereof coupled to the output circuit of said first multivibrator and an output circuit; a second terminal coupled to said beam intensity control means; second amplifier means having an input circuit including a potentiometer and a wave shaping network coupled to the output circuit of said second multivibrator and an output circuit coupled to said second terminal; a third monostable multivibrator having a first input circuit coupled to said first amplifier means, a second input circuit including differentiating means coupled to the output circuit of said second multivibrator, and an output circuit; third and fourth terminals; circuit means coupling said third terminal to said beam deflection control means; third amplifier means having an input circuit coupled to the output circuit of said third multivibrator and an output circuit coupled to said third terminal; fourth amplifier means having an input circuit coupled to the output circuit of said third amplifier means and an output circuit coupled to said fourth terminal; a sine wave oscillator including a first triode and a tuned oscillatory circuit coupled in series with a resistor between the cathode of said first triode and a point of reference potential; circuit means coupling the grid of said first triode to said fourth terminal; a cathode follower comprising a second triode, a potentiometer resistor coupled between the cathode of said second triode and said point of reference potential, and a fifth terminal coupled to the wiper of said potentiometer resistor; negative feedback means comprising a resistor coupled between the cathode of said second triode and a portion of said tuned circuit; circuit means coupling the grid of said second triode and said tuned circuit to a common terminal; a disabling circuit comprising first and second diodes having the anodes thereof connected together, circuit means connecting the cathode of said first diode to said common terminal, circuit means coupling the cathode of said second diode to said point of reference potential, and means to selectively apply a positive potential to the anodes of said diodes; sixth and seventh terminals; first phase shifting means comprising a variable resistor connected between said fifth and sixth terminals and a capacitor connected between said sixth terminal and said point of reference potential; second phase shifting means comprising a capacitor connected between said fifth and seventh terminals and a resistor coupled between said seventh terminal and said point of reference potential; means to apply a first variable direct voltage to said sixth terminal; means to apply a second variable direct voltage to said seventh terminal; a first gated cathode follower comprising a third triode provided with a cathode resistor connected to another point of reference potential, and circuit means including a diode coupled to the grid of said third triode and to said fourth terminal; fifth amplifier means further coupling the grid of said third triode to said sixth terminal; a second gated cathode follower comprising a fourth triode provided with a cathode resistor connected to said other point of reference potential, and circuit means including a diode coupled to the grid of said fourth triode and to said fourth terminal; sixth amplifier means further coupling the grid of said fourth triode to said seventh terminal; eighth and ninth terminals coupled to the deflection system of said cathode ray tube; and circuit means respectively coupling the cathode resistors of said first and second gated cathode followers to said eighth and ninth terminals.

References Cited in the file of this patent

UNITED STATES PATENTS

| | | |
|---|---|---|
| 2,638,548 | MacNichol | May 12, 1953 |
| 2,743,363 | Mautner et al. | Apr. 24, 1956 |
| 2,917,737 | Close et al. | Dec. 15, 1959 |
| 3,002,125 | Stevens et al. | Sept. 26, 1961 |

FOREIGN PATENTS

| | | |
|---|---|---|
| 1,192,361 | France | Apr. 20, 1959 |

OTHER REFERENCES

"Waveforms," by Chance, Hughes, MacNichol, Sayre and Williams, published by McGraw-Hill, 1949, page 143 relied on.

"Servomechanism Practice," by Ahrendt, published by McGraw-Hill, 1954.